United States Patent
Hwang et al.

(10) Patent No.: US 8,661,493 B2
(45) Date of Patent: Feb. 25, 2014

(54) APPARATUS AND METHOD OF PLAYING BROADCAST CONTENT IN BROADCASTING SYSTEM

(71) Applicants: Samsung Electronics Co. Ltd., Suwon-si (KR); University of Seoul Industry Cooperation Foundation, Seoul (KR)

(72) Inventors: Sung-Oh Hwang, Yongin-si (KR); Yong-Han Kim, Seongnam-si (KR); Kyung-Mo Park, Seoul (KR); Sung-Ryeul Rhyu, Yongin-si (KR)

(73) Assignees: Samsung Electronics Co., Ltd., Suwon-si (KR); University of Seoul Industry Cooperation Foundation, Seoul (KR)

( * ) Notice: Subject to any disclaimer, the term of this patent is extended or adjusted under 35 U.S.C. 154(b) by 0 days.

(21) Appl. No.: 13/624,264

(22) Filed: Sep. 21, 2012

(65) Prior Publication Data

US 2013/0081088 A1 Mar. 28, 2013

(30) Foreign Application Priority Data

Sep. 22, 2011 (KR) .......................... 10-2011-0095665

(51) Int. Cl.
*G06F 3/00* (2006.01)
*G06F 13/00* (2006.01)
*H04N 5/445* (2011.01)
*H04N 7/173* (2011.01)

(52) U.S. Cl.
USPC .............................. 725/118; 725/39; 725/114

(58) Field of Classification Search
None
See application file for complete search history.

(56) References Cited

U.S. PATENT DOCUMENTS

2010/0186048 A1 * 7/2010 Waller ........................... 725/59

FOREIGN PATENT DOCUMENTS

| JP | 2004-040380 A | 2/2004 |
|---|---|---|
| JP | 2006-109278 A | 4/2006 |
| KR | 10-2009-0037753 A | 4/2009 |
| KR | 2011-146896 A | 7/2011 |

OTHER PUBLICATIONS

"Information Technology—Generic Coding of Moving Pictures and Associated Audio Information: Systems", International Standard, Oct. 15, 2007, ISO/IEC 13818-1:200X/Amd.2:200X (E).
"Information Technology—MPEG Systems Technologies—Part 6: Dynamic Adaptive Streaming over HTTP (DASH)", International Standard, Jan. 28, 2011, ISO/IEC JTC 1/SC 29.
Kyungmo Park and Gerard Fernando, "Working Draft 2.0 of MPEG Media Transport", International Organisation for Standardisation, Organisation Internationale de Normalisation, Mar. 2011, ISO/IEC JTC1/SC29/WG11.

* cited by examiner

*Primary Examiner* — Mark D Featherstone
(74) *Attorney, Agent, or Firm* — Jefferson IP Law, LLP

(57) ABSTRACT

A method and an apparatus for playing broadcast content in a broadcasting system are provided. The method and the apparatus enable a viewer to watch an entire event by broadcasting the event through different networks in a condition that the event may not be broadcast from start to finish over a single broadcasting network.

16 Claims, 7 Drawing Sheets

APPARATUS AND METHOD OF PLAYING BROADCAST CONTENT IN BROADCASTING SYSTEM

PRIORITY

This application claims the benefit under 35 U.S.C. §119(a) of a Korean patent application filed on Sep. 22, 2011, in the Korean Intellectual Property Office and assigned Serial No. 10-2011-0095665, the entire disclosure of which is hereby incorporated by reference.

BACKGROUND OF THE INVENTION

1. Field of the Invention

The present invention relates to an apparatus and method of playing broadcast content in a broadcasting system. More particularly, the present invention relates to apparatus and method of continuously receiving a live broadcasting of an event in a single terminal.

2. Description of the Related Art

To efficiently transmit various multimedia content, the Moving Picture Experts Group (MPEG) has developed various standards, such as MPEG-2 Transport Stream (TS) and MP4 system and file formats. Standardization organizations, such as the Internet Engineering Task Force (IETF), the Institute of Electrical and Electronics Engineers (IEEE), and the 3rd Generation Partnership Project (3GPP) have also developed a variety of protocols for sending various multimedia content on the Internet, and base technologies for configuring multimedia content have used the MPEG standards.

As the integration of broadcasting and communication services has progressed since 2000, an environment now exists in which a variety of contents and services should be transmitted over different networks. Also, a situation can be generated in which a digital multimedia broadcasting receiver fails to receive a live broadcast of a certain event from start to finish over a single broadcasting network for various reasons. The following are three instances, although the number of situations is not limited thereto.

A first case is a live broadcasting of a baseball game.

The live broadcasting of the baseball game usually begins from the very first half of the 1st inning, but might not continue to the end if the game is not finished within a scheduled broadcasting time. In this case, a user (hereinafter, referred to as a "viewer") typically attempts to watch the game continuously though another means. In that case, there may be demand of continuously watching the game through the same terminal.

A second case is a live broadcasting of a golf game.

A golf game is usually continued for 5 to 6 hours a day, so a live broadcasting of the game often starts after first nine holes. However, a viewer having an interest in the game tends to watch the game from the very beginning, so they may attempt to watch the game through another means until the live broadcasting of the game starts at a scheduled broadcasting time. Also in this case, there may be demand of continuously watching the game through the same terminal.

A third case is a live broadcasting of Olympic games.

Various Olympic games are held in different stadiums at the same time. Thus, a live broadcasting of Olympic games attempts to broadcast most if not all of the popular games and is usually switched over from game to game in the middle of the game. In this regard, there may be some viewers who want to watch the entirety of a particular game and desire to have another means for this. For example, some viewers who have been watching, e.g., a judo match may be reluctant for their screens to be switched to another game, e.g., a boxing match.

As such, there is a need for an apparatus and a method of continuously playing content, such as a live broadcasting of an event, through a single terminal.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least to above-mentioned problems and/or disadvantages and to provide at least the advantages described below. Accordingly, an aspect of the present invention is to provide an apparatus and method of continuously receiving a live broadcasting of an event in a single terminal.

Another aspect of the present invention is to provide an apparatus and method of delivering a control signal, with which an event is broadcast live through different kinds of networks in a situation where a live broadcasting of the event over a single broadcasting network may not be possible from start to finish, thus allowing a viewer to watch the event subsequently or entirely.

Another aspect of the present invention is to provide an apparatus and method of seamlessly playing broadcast services provided over different kinds of networks in a single terminal.

In accordance with an aspect of the present invention, a method of playing broadcast content in a terminal of a broadcasting system is provided. The method includes playing a first broadcast signal for a predetermined event, receiving and analyzing signaling information having a service guide of a second broadcast signal either before the predetermined event is over or before a new event is initiated, and continuously playing the second broadcast signal by using the signaling information at a request of continuous watching from a user, wherein the first and second broadcast signals are in service through different networks, and wherein the signaling information is received from a broadcasting server.

In accordance with another aspect of the present invention, a method of transmitting broadcast content in a broadcasting server is provided. The method includes transmitting, to a terminal, a first broadcast signal for a predetermined event, generating signaling information having a service guide of a second broadcast signal either before the predetermined event is over or before a new event is initiated, and transmitting the signaling information to the terminal, wherein the first and second broadcast signals are in service through different networks.

In accordance with another aspect of the present invention, an apparatus for playing broadcast content in a terminal of a broadcasting system is provided. The apparatus includes a player for playing a first broadcast signal for a predetermined event, and a controller for receiving and analyzing signaling information having a service guide of a second broadcast signal either before the predetermined event is over or before a new event is initiated, wherein the player continuously plays the second broadcast signal by using the signaling information at a request of continuous watching from a user, wherein the first and second broadcast signals are in service through different networks, and wherein the signaling information is received from a broadcasting server.

In accordance with an aspect of the present invention, an apparatus for transmitting broadcast content in a broadcasting server is provided. The method includes a transmitter for transmitting a first broadcast signal for a predetermined event, and a generator for generating signaling information having a service guide of a second broadcast signal either before the predetermined event is over or before a new event is initiated, wherein the transmitter further transmits the signaling information to the terminal, and wherein the first and second broadcast signals are in service through different networks.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The invention may, however, be embodied in many different forms and should not be construed as being limited to the exemplary embodiments set forth herein. Rather, these exemplary embodiments are provided so that this disclosure will be thorough and complete, and will fully convey the concept of the invention to those skilled in the art. In the description of the present invention, if it is determined that a detailed description of commonly-used technologies or structures related to the invention may unnecessarily obscure the subject matter of the invention, the detailed description will be omitted.

In the following description, the same terminologies as defined in Moving Picture Experts Group (MPEG) standards will be used, but the present invention is not limited to the terminologies or the standards. In addition, the present invention may also be applicable to any type of system, such as MPEG Media Transport (MMT) having the same technical background.

Figure 1:
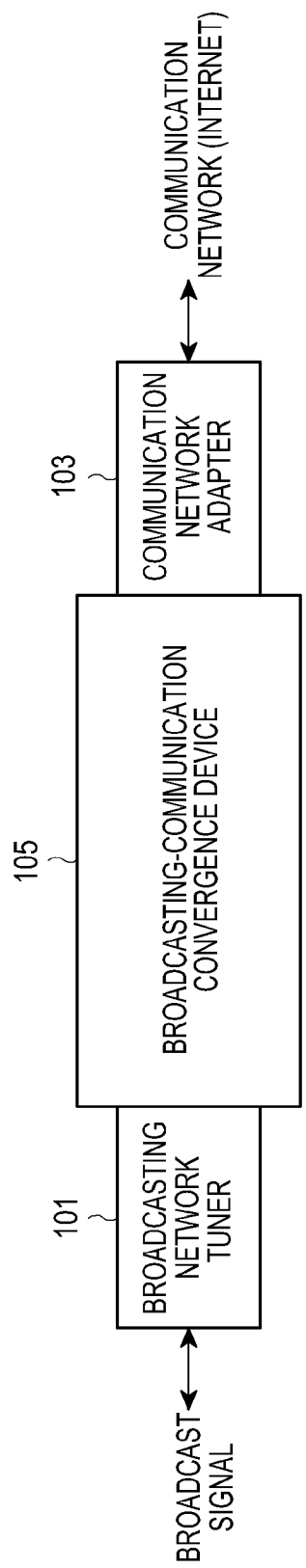
FIG. 1 is a block diagram of a broadcasting-communication convergence receiver according to an exemplary embodiment of the present invention.

FIG. 1 is a block diagram of a broadcasting-communication convergence receiver according to an exemplary embodiment of the present invention.

The broadcasting-communication convergence receiver is a receiver for convergence reception of various multimedia contents.

Referring to FIG. 1, the receiver includes a broadcasting network tuner 101, a communication network adapter 103, and a broadcasting-communication convergence device 105.

The receiver receives high resolution broadcast signals through the broadcasting network tuner 101.

The broadcasting network tuner 101 controls a received signal at a requested system level and performs a function to allow a viewer to select a desired channel from among a plurality of channels included in a high resolution broadcast signal of a predetermined frequency band.

The communication network adapter 103 receives communication data over a communication network (e.g., Internet).

As data, voices, and images have been developed in an integrated format, the broadcasting-communication convergence device 105 receives and processes broadcast data from the broadcast tuner 101 and communication data from the communication network adapter 103 together.

The broadcasting-communication convergence device 105 further includes a player (not shown) for playing a first broadcast signal for a predetermined event, and a controller (not shown) for receiving, from a broadcasting server (not shown), and analyzing signaling information having an alternate program service guide before the predetermined event is finished. The player plays a second broadcast signal consecutively by using the signaling information upon reception of a request of continuous viewing from the viewer, and the first and second broadcast signals are in service through different networks.

Hereinafter, exemplary embodiments of the present invention will be described based on the broadcasting-communication convergence receiver, as shown in FIG. 1. However, it should be understood that the present invention is not limited thereto.

Exemplary embodiments of the present invention propose signaling information at the following request, which is defined in Tables 1 and 2.

1) Subsequent Viewing after Completion of a Live Broadcast Program

When a live broadcasting of an event is terminated at the end of a scheduled broadcasting time and the event may be subsequently viewed via an alternate program on a different channel or on the Internet, the receiver should be notified of that.

2) Viewing Beforehand Before Broadcasting

When a live broadcasting of an event is scheduled but the starting point of the broadcasting is midway through the event, and there is an alternate program for the live broadcasting of the event that may be broadcast from the very beginning provided on a different channel or on the Internet, the receiver should be notified of the alternate program.

3) Viewing of an Event in its Entirety from Among Multiple Concurrent Events.

When a live broadcasting of multiple concurrent events is progressed in the way of interleaving and an alternate program for a particular event among the multiple concurrent events that may be broadcast from start to finish is attainable on a different channel or on the Internet, the receiver should be notified that, during a time slot that is not assigned to the live broadcasting of the particular event, the alternate program may be watchable.

4) Identifying of an Alternate Program

Alternate programs provided by the same broadcasting company for a predetermined period of time should be distinguished from each other and recognized by the receiver.

5) Locating of the Alternate Program

As a location from which the alternate program is read, another program channel or an Internet Uniform Resource Locator (URL) provided by the same broadcasting company should be designated.

6) Locating of the Live Broadcast Program

Location information of an original live broadcast program should be delivered in the alternate program for the original live broadcast program to the receiver so that the viewer may switch over to the original live broadcast program from the alternate program.

7) Start Timing of the Live Broadcast Program

In the case of signaling that the alternate program is watchable before the live broadcast program, information for letting the receiver know the start time of the original live broadcast program should be signaled without depending on the scheduled broadcasting information.

8) Description Information about the Alternate Program

If information regarding the alternate program is provided, a description to guide the viewer to the alternate program should be sent to the receiver.

9) Tolerance for Transmission Error of Alternate Program Signaling Information

The alternate program signaling information should be correctly delivered to the receiver even if there is some transmission error.

10) Continuity of Subsequent Viewing

When subsequent viewing is done from the alternate program to the original live broadcast program or vise versa, generation of a more or less temporal gap or repetition of a more or less already-watched section is admitted. In other words, although not aiming at seamlessly subsequent viewing, the temporal gap or the length of the repetitive section should be as minimized as possible.

Broadcast signaling operations in accordance with exemplary embodiments of the present invention will now be described, but the present invention is not limited thereto.

Figure 2:
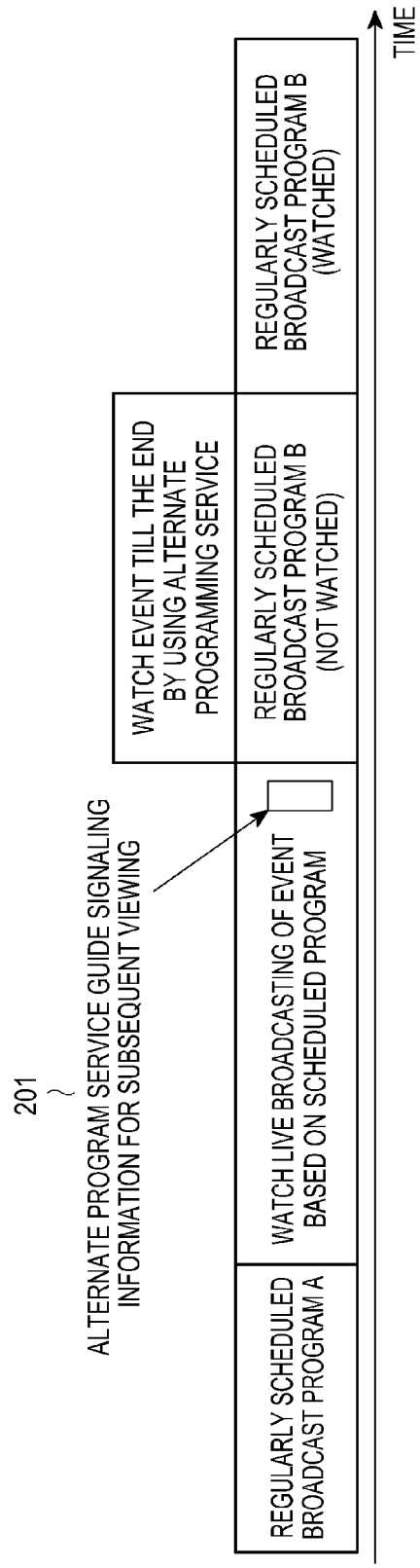
FIG. 2 shows a subsequent viewing scenario after a live broadcast program is over, according to an exemplary embodiment of the present invention.

FIG. 2 shows a subsequent viewing scenario after the live broadcast program is over, according to an exemplary embodiment of the present invention.

Referring to FIG. 2, a first exemplary embodiment of the present invention is a live broadcasting of a baseball game. In the first exemplary embodiment, when the live broadcast program through e.g., a terrestrial High Definition TeleVision (HDTV) broadcasting service is over due to a limitation of the scheduled broadcasting time before the baseball game is over, a remaining part of the game may be subsequently broadcast through e.g., Internet streaming A broadcasting company providing the broadcasting service broadcasts the remaining part of the game through the Internet streaming service based on the Moving Picture Experts Group (MPEG)-Dynamic Adaptive Streaming over Hyper Text Transfer Protocol (HTTP) (MPEG-DASH) standard after the terrestrial HDTV broadcasting service is over. The entire baseball game may as well be broadcast live through the Internet streaming service independently of the terrestrial HDTV broadcasting service. The Internet streaming service refers to a service through which a server transmits broadcast data in real time and a client plays the received broadcast data in real time. A broadcasting server of the terrestrial HDTV broadcasting company delivers to the receiver an indication that there is the Internet (streaming) service (i.e., an alternate program) that is usable after completion of the terrestrial HDTV broadcasting service, such as an address of an associated Internet streaming server or MPEG-DASH URL, in the terrestrial HDTV broadcast signaling in step 201. That is, the receiver has to be informed that subsequent viewing of the alternate program is possible on a different program channel or on the Internet. The receiver in turn informs the viewer that the subsequent viewing through the Internet streaming service is possible and enables the viewer to choose whether to subsequently watch the alternate program. Depending on implementations of the receiver, the receiver may allow the viewer to temporarily store the information of the alternate program for later use if he/she does not want to view the alternate program immediately.

In another example, the receiver may enable the user to watch the alternate program from HDTV resolution to Standard-Definition TV (SDTV) resolution as required in cable broadcasting.

Figure 3:
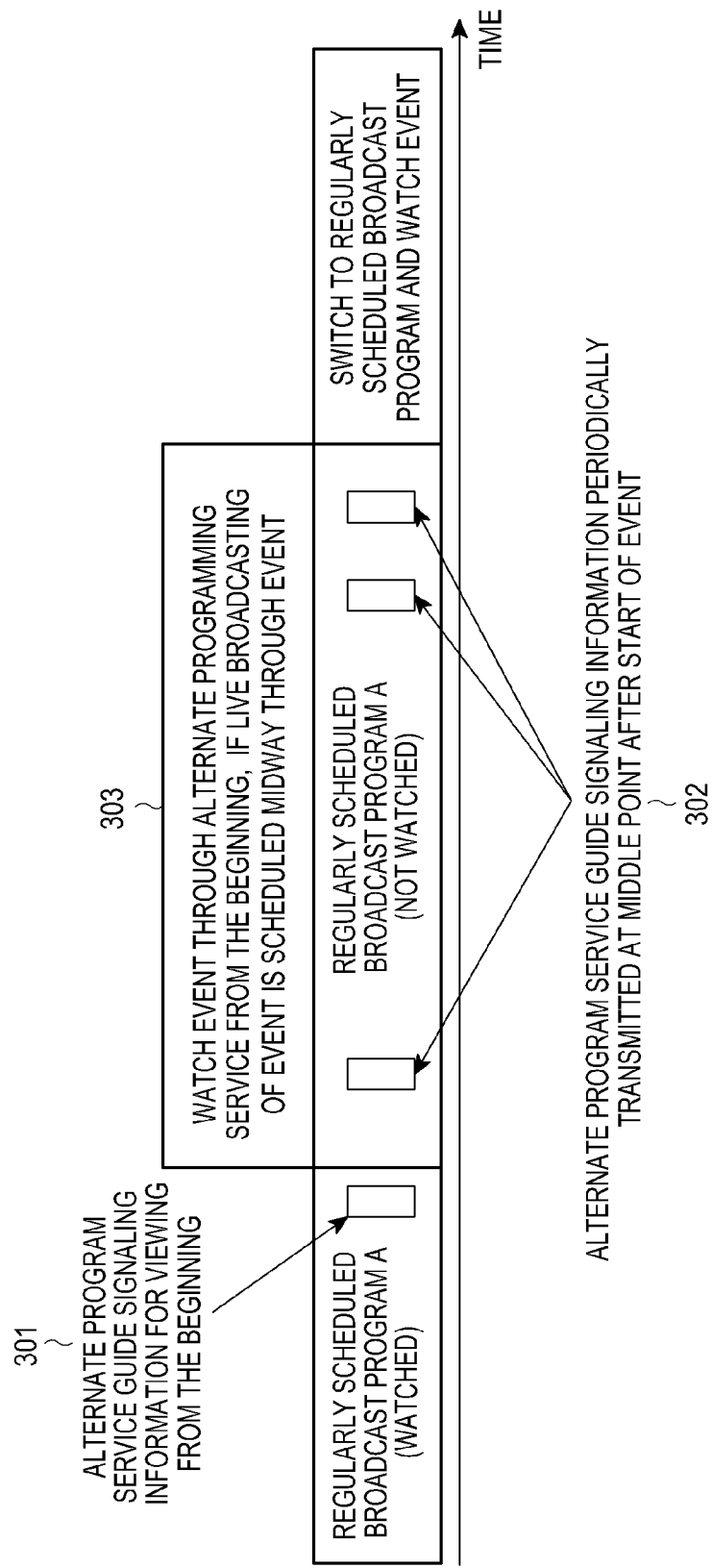
FIG. 3 shows a viewing scenario before a live broadcast program starts, according to an exemplary embodiment of the present invention.

FIG. 3 shows a viewing scenario before a live broadcast program starts, according to an exemplary embodiment of the present invention.

Referring to FIG. 3, a second exemplary embodiment of the present invention is a live broadcasting of a golf game. In the second exemplary embodiment, as shown in FIG. 3, the receiver may receive alternate program service guide signaling information 301 through Internet streaming to guide the viewer to the alternate program watchable from the very beginning of the game before the live broadcast program begins. For example, the receiver may enable the viewer to watch the game through Internet streaming before the scheduled broadcast program of the game is provided through the terrestrial HDTV broadcasting service in step 303. The broadcasting company for the terrestrial HDTV broadcasting service transmits the live broadcasting of the game through Internet streaming or the MPEG-DASH from the beginning of the game. Simultaneously, the broadcasting company delivers to the receiver an indication that there is an Internet service of the game watchable from the very beginning and an address of the associated Internet streaming server or an MPEG-DASH URL at step 302. Then, the receiver allows the viewer to choose on the screen whether to switch over to the terrestrial HDTV broadcasting service and watch the game through the HDTV service at the scheduled broadcasting time of the game while viewing the game from the beginning through the Internet streaming or MPEG-DASH. Depending on implementations of the receiver, the receiver may enable the viewer to temporarily store information of the alternate program for later use if he/she does not want to watch the alternate program right now but later on.

In the second exemplary embodiment, a transmitting end may send viewers who turn on the receiver or use the switched channel since the game has begun, i.e., the Internet streaming service of the game has begun, similar information by periodically sending the signaling information 301, 302 until the actual live broadcasting of the game begins. In the second exemplary embodiment of the present invention, when the live broadcasting of an event is scheduled but midway through the event, and another live broadcasting of the event that starts from the beginning of the event is provided as an alternate program, the broadcasting server has to inform the receiver of the fact that the alternate program may be watchable beforehand. The receiver may not resend the alternate program guide information to a viewer who was already informed of the alternate program but did not select the alternate program but maintained the original channel.

Figure 4:
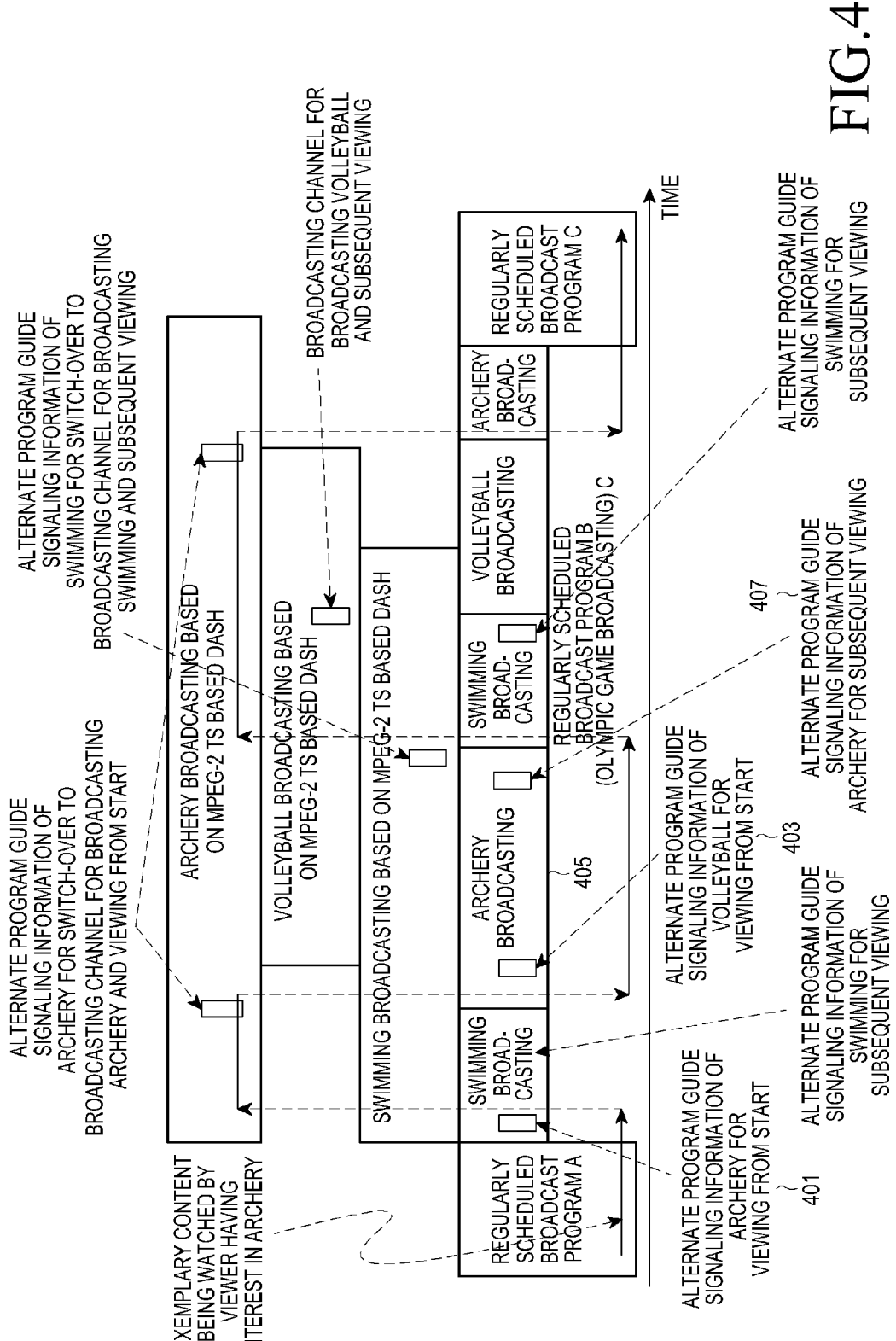
FIG. 4 shows a scenario of entirely viewing an event from among concurrent events, according to an exemplary embodiment of the present invention.

FIG. 4 shows a scenario of entirely viewing an event from among concurrent events, according to an exemplary embodiment of the present invention.

Referring to FIG. 4, a third exemplary embodiment of the present invention is a broadcasting of Olympic games.

In the third exemplary embodiment of e.g., broadcasting Olympic games live, right before changing among screens for concurrent games, the receiver may enable the viewer to be informed of the fact that there is a different service over a different network watchable consecutively in a similar way to that in the scenario of the first exemplary embodiment and to select whether to use the different service.

The receiver may also provide information to the viewer in a similar way to that in the scenario of the second exemplary embodiment, and enable him/her to select whether to use the different service beforehand.

However, for the Olympic game broadcasting, typically, the broadcasting switchover from game to game may be determined depending on how the game is going on, so the timing for the broadcasting switchover may not be informed in advance through program planning. Furthermore, there may be a situation of broadcasting a part of a preliminary match of a game, turning to a different game and then back to the game in the final, i.e., broadcasting changes for the same game may happen several times. In this case, the viewer may watch the part of the preliminary match through the HDTV broadcasting service, subsequently watch a remaining part of the preliminary match through the MPEG-2 TS based MPEG-DASH service, and turn back to the HDTV broadcasting service to watch the game in the final. For doing this, the receiver has to be informed in a currently serviced HDTV stream at a time of completion of the HDTV broadcasting service for the first part of the preliminary match that the MPEG-DASH service enabling the subsequent viewing of the game is being in service, and in an ongoing MPEG-DASH segment right before the final match begins that the game in the final will be in service through the HDTV broadcasting service. In other words, in the case the live broadcasting of multiple concurrent events is progressed in the way of interleaving, when an alternate program of a particular event among the multiple concurrent events is in service from start to finish on a different channel or on the Internet, the receiver has to be informed that the live broadcast program of the particular event may be replaced by the alternate program while the live broadcast program is not continued. If the MPEG-DASH service is an MPEG-2 TS based service, a desired signaling may be made by inserting the alternate program guide information into an MPEG-2 TS stream.

For example, as shown in FIG. 4, it may be assumed that Olympic games are broadcast live as a regular broadcast program B and in the program swimming, archery, and volleyball are broadcast through an HDTV service by turns. It is also assumed as shown in FIG. 4 that the same broadcasting company provides games of the swimming, archery, and volleyball from start to finish, as alternate programs, respectively, through the MPEG-DASH service, simultaneously with the regular broadcast program B. In this case, a viewer who is interested in the archery game 405 may use the MPEG-DASH service to watch the archery game by using alternate program guide signaling information 401 of the archery, and turn back to the HDTV service to continue to watch the regular broadcast program by using alternate program guide signaling information 403 of the archery, which is delivered in the MPEG-DASH segment right before the archery game begins. Specifically, when the HDTV broadcasting service turns to the swimming game after broadcasting a part of a preliminary match of the archery, the receiver enables the viewer to continue to watch the archery through the MPEG-DASH service by using the alternate program guide signaling information 407 of the archery, which is delivered right before the switchover to the swimming, and when it is time to broadcast the archery in final through the HDTV broadcasting service, the receiver may switch over to the HDTV broadcasting service from the MPEG-DASH service in the similar process.

According to exemplary embodiments of the present invention, signaling information may be defined below.

The signaling information may be applicable to each of the first through third exemplary embodiments.

For terrestrial, satellite, and cable DTV and HDTV broadcasting services that employ the MPEG-2 TS standard, a signaling method compatible with the current broadcasting method is proposed below. The term "compatible" implies that an existing broadcasting receiver may ignore the signaling while a new receiver that recognizes the signaling may support an associated function.

An alternate program descriptor, alternate_program_descriptor that will be defined below is inserted for a required time into a program-level descriptor syntax loop within a Program Map Table (PMT) transmitted in an MPEG-2 TS formatted bitstream.

The alternate_program_descriptor is defined below.

A syntax of the alternate_program_descriptor is shown in Table 1, and a semantic of each syntax element is described below. In the following Table 1, the syntax and definitions of formats of the syntax elements conforms to the MPEG-2 system standard.

TABLE 1

| Syntax | Value | Number of Bits | Format |
|---|---|---|---|
| alternate_program_descriptor( ) { | | | |
|   descriptor_tag | | 8 | uimsbf |
|   descriptor_length | | 8 | uimsbf |
|   alternate_program_id | | 8 | uimsbf |
|   reserved | 0x7F | 7 | bslbf |
|   future_flag | | 1 | bslbf |
|   if (future_flag == 1) { | | | |

TABLE 1-continued

| Syntax | Value | Number of Bits | Format |
|---|---|---|---|
|     time_to_future_live_program | | 16 | uimsbf |
|   } | | | |
|   locator_type | | 8 | uimsbf |
|   if (locator_type == 0x01) { | | | |
|     transport_stream_id | | 16 | uimsbf |
|     program_number | | 16 | uimsbf |
|   } else if (locator_type == 0x02) { | | | |
|     locator_length | N1 | 8 | uimsbf |
|     for (i=0; i<N1; i++) { | | | |
|       locator_byte | | 8 | uimsbf |
|     } | | | |
|   } else { | | | |
|   } | | | |
|   text_length | N2 | 8 | uimsbf |
|   for (i=0; i<N2; i++) { | | | |
|     text_byte | | 8 | uimsbf |
|   } | | | |
|   for (i=0; i<N3; i++) { | | | |
|     extension_descriptor( ) | | | |
|   } | | | |
| } | | | |

In Table 1, the field descriptor tag is an 8-bit field indicating which descriptor it is. To distinguish an alternate program descriptor from other descriptors defined by the MPEG-2 system standard or a broadcasting standard based on the MPEG-2 system standard, a unique value is assigned to indicate that it is an alternate program descriptor.

The field descriptor length is an 8-bit field that represents the length of the descriptor in bytes. It represents the length from a byte next to this field to the last byte of the descriptor.

The field alternate_program_id is an 8-bit field indicating an identifier of the alternate program. If a different alternate program is described by the alternate_program_descriptor, then a different alternate_program_id is assigned.

In order to guide a viewer to watch the alternate program before live broadcasting begins, the guide information about the same alternate program may be periodically transmitted several times. In this case the same alternate_program_id is used. When any of values 0~255 was used, the used value is re-used.

A reserved field is a field that is reserved for later use and filled with 0x7F.

The field future_flag is a 1-bit field indicating whether the information in this field concerns an alternate program watchable from beforehand or an alternate program to be watched after the completion of the current broadcast program. The field future_flag having a value '1' represents the alternate program watchable from beforehand, and the field future_flag having a value '0' represents the alternate program to be watched after the completion of the current broadcast program.

The field time_to_future_live_program is a 16-bit field indicating a time count in seconds until the live broadcast program on this broadcasting channel starts, insofar as the field future_flag has the value '1'. If the field time_to_future_live_program has a value 0x0000, it means that the live broadcast program has already begun.

The field time_to_future_live_program may not be used when the switchover from the MPEG-2 TS based Internet broadcasting service to the live broadcast program on a broadcasting channel is done. If the field time_to_future_live_program has a value of 0xFFFF, it represents that the time count left until the live broadcast program starts on the broadcasting channel is not known. The value of the field time_to_future_live_program is used when the receiver does not know when the scheduled live broadcast program of an event will start while providing the alternate program of the event via e.g., the Internet live broadcasting service.

The field locator_type is an 8-bit field indicating a type of a field designating a location of the alternate program. The field locator_type may have values as in the following Table 2.

TABLE 2

| Values of Locator_type | Description |
|---|---|
| 0x00 | A live broadcasting channel (used when to be switched over from the alternate program, and only available when the alternate program uses the alternate_program_descriptor) |
| 0x01 | A different program channel |
| 0x02 | MPEG-DASH URL |
| 0x03~0xFF | Reserved |

In Table 2, the field locator_type having a value of 0x00 corresponds to an instance to return to the live broadcasting channel from the alternate program in the first to third exemplary embodiments, the field locator_type having a value of 0x01 corresponds to an instance of a different broadcasting channel, and the field locator_type having a value of 0x02 corresponds to an instance of the Internet. However, any other types may also be defined by using the value of the reserved, and so the present invention is not limited to the types in Table 2.

The field transport_id in Table 1 is a TS identifier defined by the MPEG-2 system standard.

The field program_id is a program identifier defined by the MPEG-2 system standard.

The field locator_length is an 8-bit field indicating the number of bytes of following the field locator_byte.

The field locator_byte is a string in bytes to indicate a location of the alternate program, which does not include a null byte at the end.

The field text_length is an 8-bit field indicating the number of bytes of following text_byte. A value of 0x00 represents no text string for describing that the alternate program exists.

The field text_byte is a string in bytes to indicate the text string for describing the alternate program, which does not include a null byte at the end.

The field extension_descriptor( ) is a descriptor of an option to provide additional information, whose 8-bit tag value that tells the kind is one and only distinguished within the field alternate_program_descriptor and is the first byte of the descriptor, which is followed by an 8-bit value indicating the length of the descriptor.

Positions into which the field alternate_program_descriptor may be inserted are as follows.

Table 3 shows the positions into which the field alternate_program_descriptor may be inserted in the known MPEG-2 PMT syntax.

TABLE 3

| Syntax | Number of Bits | Format |
|---|---|---|
| TS_program_map_section( ) { | | |
|   table_id | 8 | uimsbf |
|   section_syntax_indicator | 1 | bslbf |
|   '0' | 1 | bslbf |
|   reserved | 2 | bslbf |
|   section_length | 12 | uimsbf |
|   program_number | 16 | uimsbf |

TABLE 3-continued

| Syntax | Number of Bits | Format |
|---|---|---|
| reserved | 2 | bslbf |
| version_number | 5 | uimsbf |
| current_next_indicator | 1 | bslbf |
| section_number | 8 | uimsbf |
| last_section_number | 8 | uimsbf |
| reserved | 3 | bslbf |
| PCR_PID | 13 | uimsbf |
| program-level descriptor syntax loop | | |
| reserved | 4 | bslbf |
| program_info_length | 12 | uimsbf |
| for (i=0; i<N; i++) { | | |
|     descriptor( )/* | | |
|     alternate_program_descriptor insertion position */ | | |
| } | | |
| for (i=0; i<N1; i++) { | | |
|     stream_type | 8 | uimsbf |
|     reserved | 3 | bslbf |
|     elementary_PID | 13 | uimsbf |
|     reserved | 4 | bslbf |
|     ES_info_length | 12 | uimsbf |
|     for (i=0; i<N2; i++) { | | |
|         descriptor( ) | | |
|     } | | |
| } | | |
| CRC_32 | 32 | rpchof |
| } | | |

Insertion points and periods of the field alternate_program_descriptor are as follows.

The alternate_program_descriptor field is inserted repeatedly (e.g., 4 or times) into PMTs that appear for a period of time from a given time before the live broadcasting is over, in the case after an event broadcast live on a broadcasting channel indicated by a PMT including the alternate_program_descriptor field is over, the alternate_program_descriptor field delivers information about the alternate program to be watchable subsequently. The reason that the alternate_program_descriptor field is repeatedly inserted is to increase the probability of delivering signaling information to the receiver even if a transmission failure occurs. Furthermore, if the alternate_program_descriptor field delivers information about the alternate program watchable beforehand, it is periodically (e.g., at 10 minute intervals) inserted in the PMT of a channel on which live broadcasting is scheduled from a start point of the event. Doing this is to guide the viewer who turned on the receiver or switched to a channel since the event has begun to the alternate program. At this time, even if a transmission failure occurs, the alternate_program_descriptor field is repeatedly inserted to increase the probability of delivering the information to the receiver.

The receiver may interpret the first one from among repeatedly received alternate_program_descriptor field having the same alternate_program_id field and discard the others.

Exemplary embodiments of the present invention may be applicable to a signaling method in the MPEG Media Transport (MPEG MMT) in the following description. An exemplary method by which the similar benefits are attainable in an MMT standard being standardized by the MPEG is suggested as follows.

The MMT Working Draft (MMT WD) defines a concept corresponding to the MPEG-2 program as a package.

Information about the alternate program is signaled to the receiver by inserting the alternate_program_descriptor field, defined above, into a package level descriptor syntax loop within the tentatively named Package Packing Table (PPT) that serves a similar function to the PMT of MPEG-2 TS. The PPT has not yet been included in the MMT WD, but a similar table may be defined in the coming years. However, a "program" written in the alternate_program_descriptor field is replaced by a "package". For example, the "alternate_program_descriptor" field is substituted with "alternate_package_descriptor" field.

Figure 5:
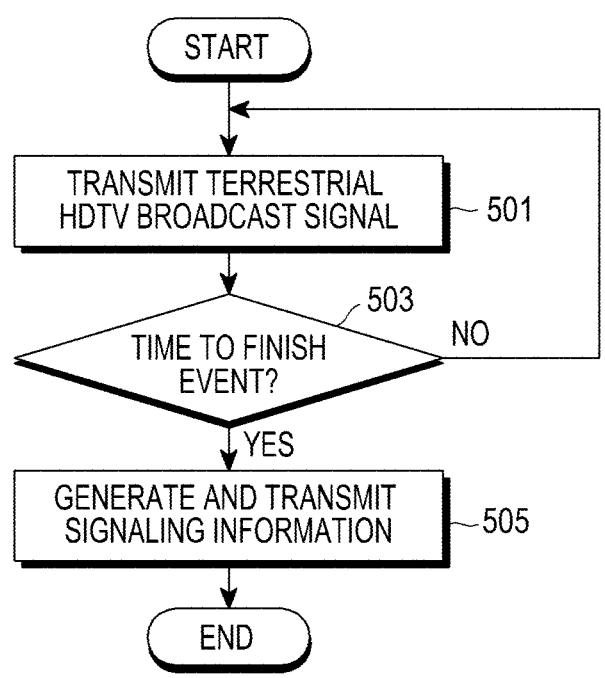
FIG. 5 is a flowchart of a method of transmitting broadcast content in a broadcasting server, according to an exemplary embodiment of the present invention.

FIG. 5 is a flowchart of a method of transmitting broadcast content in a broadcasting server, according to an exemplary embodiment of the present invention.

Referring to FIG. 5, in step 501, the broadcasting server transmits a terrestrial HDTV broadcast signal.

The broadcasting server determines if it is time to finish transmission of the terrestrial HDTV broadcast signal in step 503. If it is not time to finish the transmission, the broadcasting server returns to step 501 and continues to transmit the terrestrial HDTV broadcast signal. Otherwise, if it is time to finish the transmission, the broadcasting server generates signaling information according to an exemplary embodiment of the present invention and transmits the signaling information to a terminal or receiver in step 505.

In this regard, although not shown in the attached drawings, the broadcasting server includes a transmitter for transmitting a first broadcast signal of a predetermined event to the terminal, and a generator for generating the signaling information that contains an alternate program service guide before the event is over. The transmitter also transmits the signaling information to the terminal.

Figure 6:
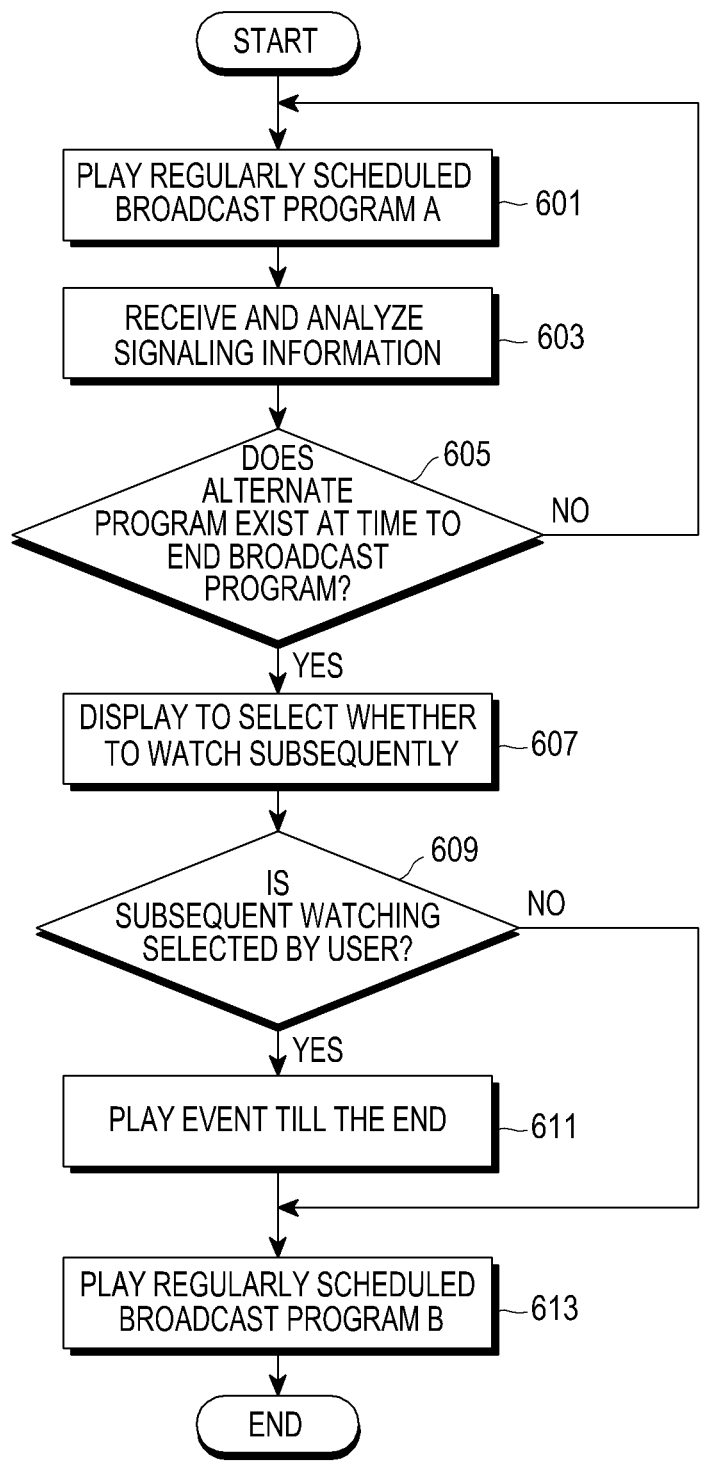
FIG. 6 is a flowchart of a method of receiving broadcast content in a terminal according to an exemplary embodiment of the present invention.

FIG. 6 is a flowchart of a method of receiving broadcast content in a terminal according to an exemplary embodiment of the present invention.

Referring to FIG. 6, the terminal receives from the broadcasting server a broadcast signal corresponding to a regularly scheduled broadcast program A in step 601.

After that, the terminal receives the signaling information from the broadcasting server and analyzes the signaling information in step 603, and determines if there is guide information about the alternate program after the broadcast of the predetermined event is over in step 605. The predetermined event is defined as an activity of which the regularly scheduled broadcast program A is broadcast. If there is no guide information about the alternate program, the terminal returns to step 601 and receives the broadcast signal corresponding to a regularly scheduled broadcast program A. On the other hand, if there is the guide information after the broadcast of the predetermined event is over, the terminal displays a window to allow the viewer to choose whether to watch the event subsequently in step 607.

The terminal determines if the viewer chose the subsequent viewing of the event in step 609. If the viewer did not choose the subsequent viewing, the terminal proceeds to step 613 and plays a regularly scheduled broadcast program B. Otherwise, if the viewer did choose the subsequent viewing, the terminal proceeds to step 611 and plays the event till the end through the alternate program.

Figure 7:
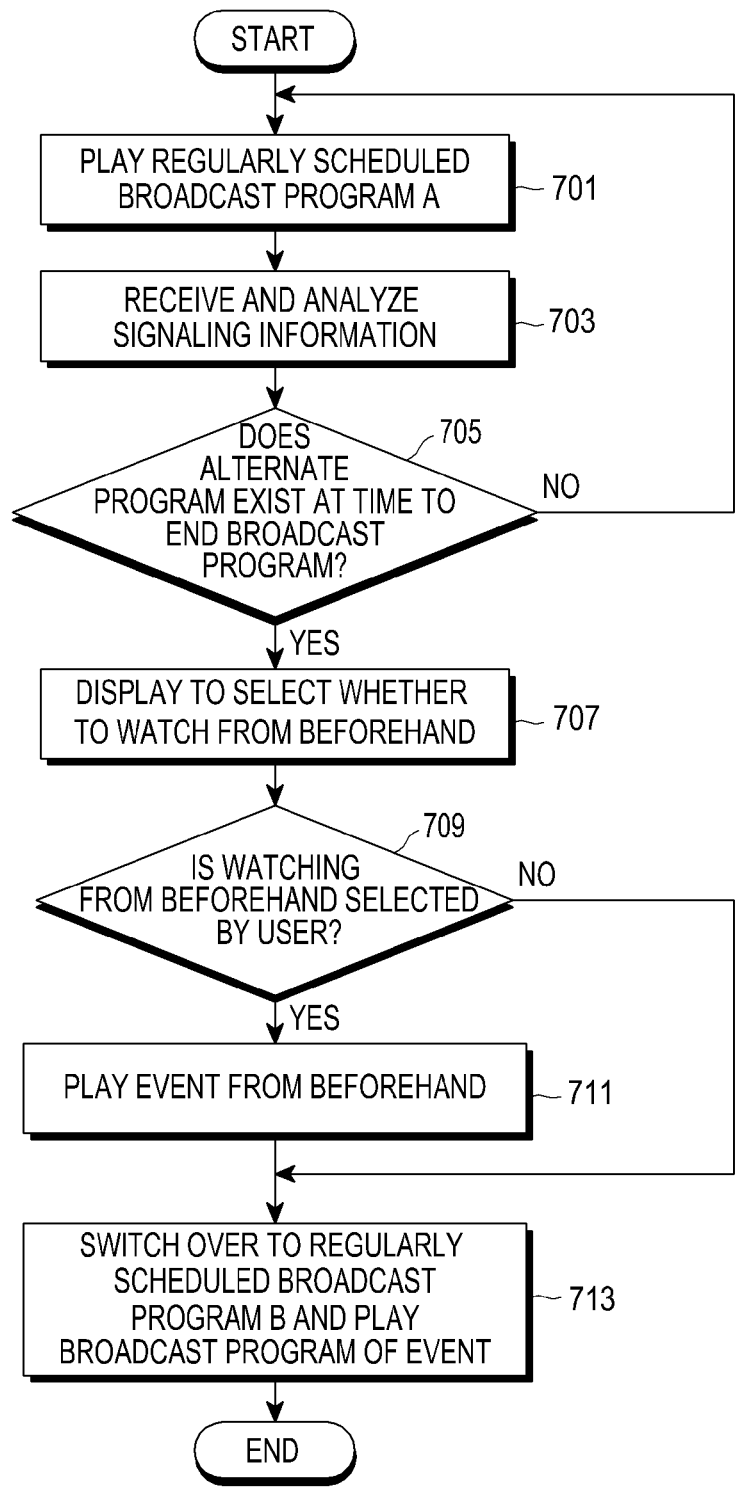
FIG. 7 is a flowchart of a method of receiving broadcast content in a terminal, according to an exemplary embodiment of the present invention.

FIG. 7 is a flowchart of a method of receiving broadcasting content in a terminal, according to an embodiment of the present invention.

Referring to FIG. 7, the terminal receives from a broadcasting server a broadcast signal corresponding to a regularly scheduled broadcast program A in step 701.

The terminal receives and analyzes the signaling information included in the PMT of the regularly scheduled broadcast program A while receiving the broadcasting signal in step 703.

The terminal determines from a result of the analysis if there is guide information about the alternate program to be watchable from beforehand in step 705. If it is not the case, the terminal returns to step 701 and continues receiving the broadcasting signal corresponding to a regularly scheduled broadcast program A, and otherwise, if it is the case, the terminal displays a window to allow the viewer to choose whether to watch the event from beforehand in step 707. The terminal determines if the viewer has chosen the viewing of the event from beforehand in step 709. If it is not the case, the terminal proceeds to step 713 and switches over to and plays the regularly scheduled broadcast program A. Otherwise, if it is the case, the terminal proceeds to step 711 and plays the event from beforehand through the alternate program. After that, the terminal returns and plays the regularly scheduled broadcast program A in step 713.

In the specification, the MPEG DASH standard mentioned above conforms to "ISO/IEC JTC1/SC29/WG11 N11749, Text of ISO/IEC DIS 23001-6, Information technology—MPEG systems technologies—Part 6: Dynamic adaptive streaming over HTTP (DASH), Daegu, Korea, January 2011."

The MPEG-2 TS standard conforms to "ISO/IEC 13818-1:2007, Information technology—Generic coding of moving pictures and associated audio information: Systems, 3rd Edition, 2007-10-15."

The MMT standard conforms to "ISO/IEC JTC1/SC29/WG11 N11953, Working Draft 2.0 of MPEG Media Transport, Geneva, Switzerland, March 2011."

According to exemplary embodiments of the present invention, a live broadcasting of an event is continuously received by a single terminal.

According to exemplary embodiments of the present invention, an event is broadcast live through different kinds of networks in a situation where a live broadcasting of the event may not be provided from start to finish, thus allowing a viewer to watch the entire event.

According to exemplary embodiments of the present invention, broadcast services from different kinds of networks may be seamlessly played by the single terminal.

Although the foregoing description of the present invention is provided in connection with some exemplary embodiments, various modifications can be made possible without departing the present invention only defined by the accompanying claims.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of playing broadcast content in a terminal of a broadcasting system, the method comprising:
    playing a first broadcast signal for a predetermined event;
    receiving and analyzing signaling information having a service guide of a second broadcast signal either before the predetermined event is over or before a new event is initiated; and
    continuously playing the second broadcast signal by using the signaling information,
    wherein the first and second broadcast signals are in service through different networks; and
    wherein the signaling information is received from a broadcasting server; and
    wherein the signaling information comprises:
        a field to identify an alternate program;
        a field to represent whether the alternate program is an alternate program for watching beforehand or an alternate program for watching subsequently; a field to represent a time count in seconds until a live broadcasting begins; and
        a field to represent a type of a field that represents a location of the alternate program.

2. The method of claim 1, wherein the second broadcast signal comprises an alternate program for the first broadcast signal.

3. The method of claim 1, wherein the field to represent the type represents one of a watched channel before using the alternate program, a channel for broadcasting, and an Internet streaming.

4. The method of claim 3, wherein the signaling information is included in a program-level descriptor syntax loop within a Program Map Table (PMT).

5. A method of transmitting broadcast content in a broadcasting server, the method comprising:
    transmitting, to a terminal, a first broadcast signal for a predetermined event;
    generating signaling information having a service guide of a second broadcast signal either before the predetermined event is over or before a new event is initiated; and
    transmitting the signaling information to the terminal,
    wherein the first and second broadcast signals are in service through different networks; and
    wherein the signaling information comprises:
        a field to identify an alternate program;
        a field to represent whether the alternate program is an alternate program for watching beforehand or an alternate program for watching subsequently; a field to represent a time count in seconds until a live broadcasting begins; and
        a field to represent a type of a field that represents a location of the alternate program.

6. The method of claim 5, wherein the second broadcast signal comprises an alternate program for the first broadcast signal.

7. The method of claim 5, wherein the field to represent the type represents one of a watched channel before using the alternate program, a channel for broadcasting, and an Internet streaming.

8. The method of claim 7, wherein the signaling information is included in a program-level descriptor syntax loop within a Program Map Table (PMT).

9. An apparatus for playing broadcast content in a terminal of a broadcasting system, the apparatus comprising:
    a player for playing a first broadcast signal for a predetermined event; and
    a controller for receiving and analyzing signaling information having a service guide of a second broadcast signal either before the predetermined event is over or before a new event is initiated,
    wherein the player continuously plays the second broadcast signal by using the signaling information,
    wherein the first and second broadcast signals are in service through different networks, and
    wherein the signaling information is received from a broadcasting server; and
    wherein the signaling information comprises:
        a field to identify an alternate program;
        a field to represent whether the alternate program is an alternate program for watching beforehand or an alternate program for watching subsequently; a field to represent a time count in seconds until a live broadcasting begins; and
        a field to represent a type of a field that represents a location of the alternate program.

10. The apparatus of claim 9, wherein the second broadcast signal comprises an alternate program for the first broadcast signal.

11. The apparatus of claim 9, wherein the field to represent the type represents one of a watched channel before using the alternate program, a channel for broadcasting, and an Internet streaming.

12. The apparatus of claim 11, wherein the signaling information is included in a program-level descriptor syntax loop within a Program Map Table (PMT).

13. An apparatus for transmitting broadcast content in a broadcasting server, the apparatus comprising:
- a transmitter for transmitting a first broadcast signal for a predetermined event; and
- a generator for generating signaling information having a service guide of a second broadcast signal either before the predetermined event is over or before a new event is initiated,
- wherein the transmitter further transmits the signaling information to the terminal, and
- wherein the first and second broadcast signals are in service through different networks; and wherein the signaling information comprises:
- a field to identify an alternate program;
- a field to represent whether the alternate program is an alternate program for watching beforehand or an alternate program for watching subsequently; a field to represent a time count in seconds until a live broadcasting begins; and
- a field to represent a type of a field that represents a location of the alternate program.

14. The apparatus of claim 13, wherein the second broadcast signal comprises an alternate program for the first broadcast signal.

15. The apparatus of claim 13, wherein the field to represent the type represents one of a watched channel before using the alternate program, a channel for broadcasting, and an Internet streaming.

16. The apparatus of claim 15, wherein the signaling information is included in a program-level descriptor syntax loop within a Program Map Table (PMT).

* * * * *